(12) United States Patent
Wang et al.

(10) Patent No.: US 6,717,696 B1
(45) Date of Patent: Apr. 6, 2004

(54) SYSTEMS AND METHODS FOR MOIRÉ-REDUCED HALFTONING

(75) Inventors: Shen-ge Wang, Fairport, NY (US); Zhigang Fan, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/329,265

(22) Filed: Jun. 28, 1999

(51) Int. Cl.[7] ............................. G06F 15/00; G06K 1/00
(52) U.S. Cl. ....................... 358/1.9; 358/1.9; 358/533; 358/534; 358/3.06; 358/3.26; 382/264; 382/254
(58) Field of Search .................. 382/162, 237, 382/264, 254; 358/520, 1.9, 534, 3.06, 3.26, 3.24, 448, 533

(56) References Cited

U.S. PATENT DOCUMENTS

| | | | |
|---|---|---|---|
| 5,363,210 A | * 11/1994 | Sasaki et al. | 358/448 |
| 5,469,267 A | 11/1995 | Wang | 358/459 |
| 5,854,882 A | 12/1998 | Wang | 358/1.9 |
| 5,991,513 A | * 11/1999 | Levien | 358/3.06 |
| 6,181,445 B1 | * 1/2001 | Lin et al. | 358/504 |
| 6,320,676 B1 | * 11/2001 | Yoshidome | 358/1.9 |
| 6,349,146 B2 | * 2/2002 | Roetling | 382/162 |

OTHER PUBLICATIONS

Shen–ge Wang, *Algorithm–Independent Color Calibration for Digital Halftoning*, Xerox Corporation, Webster, New York, USA.

* cited by examiner

Primary Examiner—Kimberly Williams
Assistant Examiner—Melanie M. Vida
(74) Attorney, Agent, or Firm—Oliff & Berridge, PLC

(57) ABSTRACT

By using negative feedback, moiré patterns can be reduced, or virtually eliminated, from input black-and-white or color original images. In particular, by feeding back an image containing the difference between the original input image and the halftone output with possible moiré patterns, and subtracting the low-frequency part of this image from the original input image, a resultant halftone image can be achieved that has reduced moiré patterns.

27 Claims, 16 Drawing Sheets

SYSTEMS AND METHODS FOR MOIRÉ-REDUCED HALFTONING

BACKGROUND OF THE INVENTION

1. Field of Invention

This invention is related to halftone images.

2. Description of Related Art

Moiré effects occur when two periodic structures of nearly the same period are superposed. As a result, a new family of periodic structures with a larger period appears. The simplest and most noticeable moiré pattern can be seen when two line screen patterns are superposed and oriented at a small angle relative to each other.

The moiré effect can be interpreted as the result of interference between the two image components that have slightly different spatial frequencies. A halftone image generated by a screening technique possesses a strong image component at the halftone screen frequency. When a previously halftoned image is used as the input for a new halftone process, a moiré pattern might occur if the second halftone screen has a frequency close to the frequency of the original halftone screen.

SUMMARY OF THE INVENTION

The methods and systems of this invention use negative feedback to reduce moiré effects in halftone images. By determining the difference between an input image and the output image after halftoning, and subtracting the low-frequency part of the difference from the original input image, the moiré effects can be reduced.

As with the black-and-white process, the same basic principles can be extended to color images for reduction of moiré effects within certain color channels and between multiple color channels.

This invention provides systems and methods that reduce moiré effects in black-and-white halftone images.

This invention separately provides systems and methods for reducing moiré effects in color halftone images.

This invention separately provides systems and methods for reducing moiré effects that occur between color channels of a color halftone image.

These and other features and advantages of this invention are described in or are apparent from the following detailed description of the exemplary embodiments.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

The moiré effect reduction systems and methods according to this invention reduce the amount of moiré effects that can be seen in a halftone image, while preserving the information content of the image. If a two-dimensional image is converted into the frequency domain, such as through the use of Fast Fourier Transform (FFT), the content of the image can be described quantitatively as information in terms of spatial frequencies. In particular, high spatial frequency information corresponds to high detail portions of the image, and the low spatial frequency information corresponds to slow-varying, or low detail, portions of the image. The general description of image representation using frequency components can be found in many image processing textbooks, such as, "Digital Image Processing" by Rafael C. Gonzalez and Richard E. Woods.

Since the halftone process converts an input image into a binary output image, the high-frequency information of the input image, especially the information with frequencies higher than the halftone-screen frequency, is greatly altered by the halftone process. When the halftone image is viewed at a normal reading distance, the low-frequency content of the image is observed. This occurs due to the way in which humans perceive images. In particular, the greater the distance the halftoned image is from the observer, the more the high frequency information of the image is ignored. Therefore, the main goal of the halftone process is to maintain the low frequency information of the original image, while avoiding low frequency artifacts.

If the input image of a halftone process is a previously halftoned image, and the current halftone screen has a spatial frequency that is close to the spatial frequency to the previously used halftone screen, a moiré pattern will appear in the halftone output. For example, if the input image has a screen frequency of 100 lines per inch (LPI), and the new halftone screen has a frequency of 101 lines per inch, the one line difference will create an artifact. This difference is a low frequency, or one line per inch, moiré effect. As another example, even if the new halftone screen also has a frequency of 100 lines per inch, but is shifted by an angle of, for example, 5 degrees from the orientation of the input image screen, a low-frequency, 8.7 line per inch moiré effect will be observed due to the vector difference between the two screen frequencies.

Since low frequency image changes are more easily noticed by observers than changes in the high frequency portions of the image, the undesirable low frequency artifacts created by moiré effects need to be removed to preserve image quality.

Figure 1:
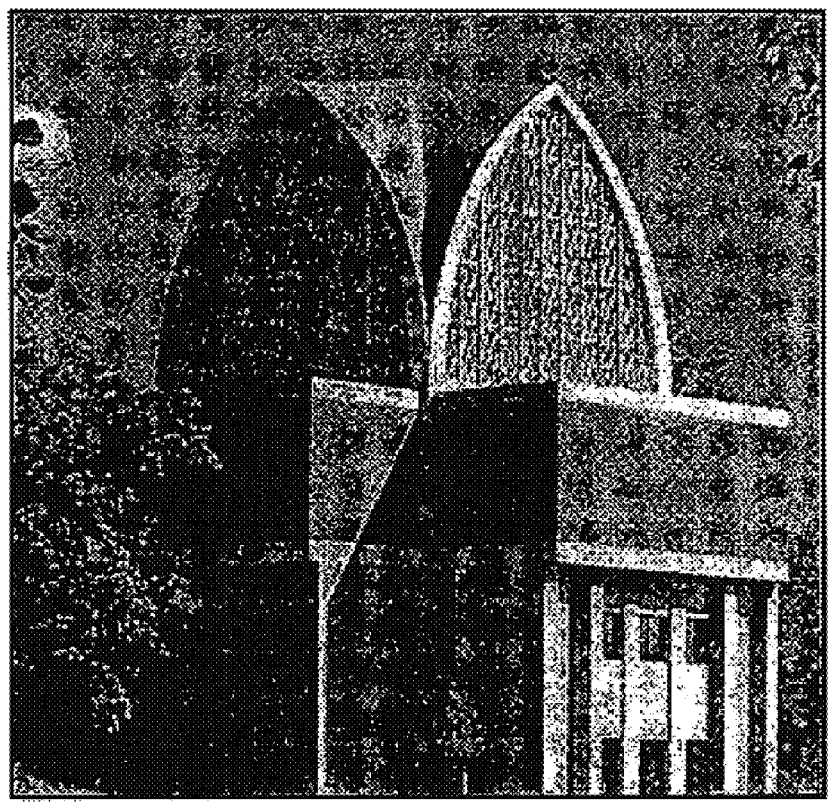
FIG. 1 shows an image containing a moiré effect.

FIG. 1 shows a halftone image that contains moiré effects. These effects can be seen as darkened lines which extend from the lower left portion to the upper right portion of the image, as well as from the lower right portion to the upper left portion of the image. These moiré patterns produce a crosshatched effect that is clearly visible in the halftone image shown in FIG. 1.

To remove these undesirable effects, the methods and systems of this invention input an original image and convert the original image into a halftone image. It should be appreciated that, if the input image is binary valued image data, the binary valued data can be converted into equivalent continuous-tone image data values before halftoning. The systems and methods of this invention then use a printer model to predict what the output image would look like from the halftone binary image. The original continuous-tone valued input image is then subtracted from this predicted continuous-tone image to yield a feedback image. This feedback image is then filtered by a low-pass filter and subtracted from the original input image to yield an adjusted, or moiré effect reduced, continuous-tone image. This adjusted image is then halftoned. The halftone result of the adjusted image, with a visible reduction in the moiré effects, can then be output as the final binary image.

Figure 2:
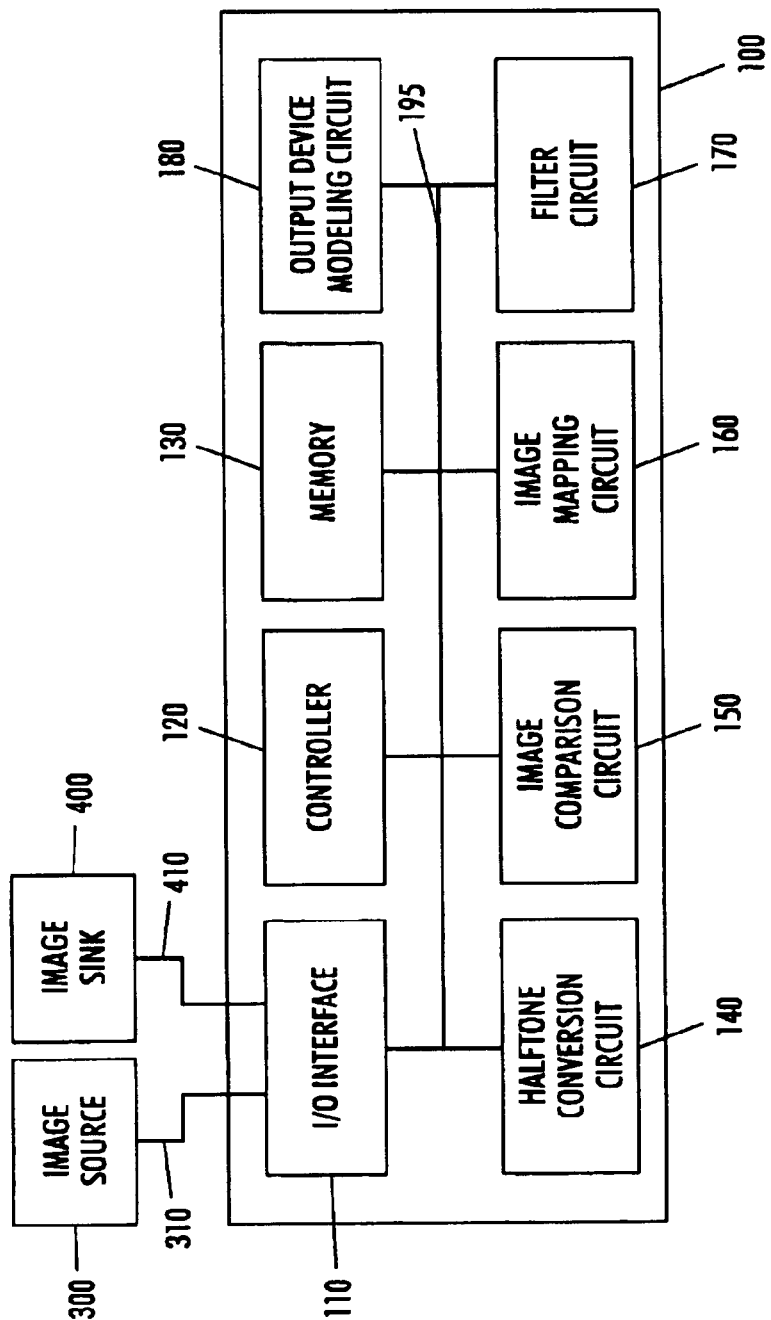
FIG. 2 is a functional block diagram of a first exemplary embodiment of moiré effect reduction systems according to this invention.

FIG. 2 is a functional block diagram of one exemplary embodiment of a moiré effects reduction system 100. The moiré effects reduction system 100 is particularly useful for black-and-white images. As shown in FIG. 2, the moiré effects reduction system 100 comprises an I/O interface 110, a controller 120, a memory 130, a halftone conversion circuit 140, an image comparison circuit 150, an image mapping circuit 160, a low-pass filtering circuit 170, an output device modeling circuit 180 and a control/data bus 195.

A continuous-tone image is input from an image source 300 over a signal line 310 to the moiré effect reduction system 100. It should be appreciated that the image source 300 can be any device that stores and/or generates an electronic version of the image.

Thus, the image can be a printed hard copy version of the image, and the image source 300 can be a scanner that scans and outputs an electronic version of the image over the signal line 310 to the moiré effect reduction system 100. Furthermore, the image source 300 and the moiré effect reduction system 100 can be elements integrated into a digital photocopier, printer, facsimile machine, personal computer, or the like.

Similarly, the image source 300 can be a server or other node on a local area network, a wide area network, an intranet, the Internet, or any other distributed network. Similarly, image source 300 can be a storage device or any known structural apparatus for indefinitely storing the image, such as RAM, a hard drive and disk, a floppy drive and disk, an optical drive and disk, a flash memory or the like. In this case, the image is already stored in electronic form. The image source 300 and the signal line 310 can be any known or later developed elements that are capable of supplying an electronic image to the moiré effect reduction system 100.

The image sink 400 can be any device that outputs, displays or stores the resulting adjusted halftone binary image. For example, the image sink 400 can be a printer, a video display, a photocopy machine, a volatile or non-volatile storage media or any other image sink that is capable of displaying or storing the adjusted halftone binary image. Additionally, the image sink 400 can be a storage device or any known structural apparatus for indefinitely storing the image, such as RAM, a hard drive and disk, a floppy drive and disk, an optical drive and disk, a flash memory or the like. The image sink 400 and the signal line 410 can be any known or later developed elements that are capable of receiving an electronic image from the moiré effect reduction system 100.

The signal lines 310 and 410 can be any known or later developed device or system for connecting the image source 300 and the image sink 400, respectively, to the moiré effects reduction system 100, including a direct cable connection, a connection over a wide area network or a local area network, a connection over an intranet, a connection over the Internet, or a connection over any other distributed processing network or system. Finally, the signal line 310 can be a wired or wireless link to the scanner or other image conversion device or to the network that forms and/or stores the image source 300. In general, the signal lines 310 and 410 can be any known or later developed connection system or structure usable to connect the image input device and the image output device to the moiré effects reduction system.

As discussed above, the systems and methods of this invention work equally well on images that have always been in the digital domain. In this case, the image is already in digital format and the image is ready for processing by the moiré effect reduction system 100.

The input image, such as a continuous-tone image, is received via the signal line 310 by the I/O interface 110. At the direction of the controller 120, and in cooperation with the memory 130, the halftone conversion circuit 140 converts the received image into a halftone binary image. As outlined above, if the input image is binary valued image data, the binary valued data can be converted into equivalent continuous-tone image data values before halftoning. The halftone binary image is then transferred to the output device modeling circuit 180.

The output device modeling circuit 180 predicts a continuous-tone image from the halftone binary image. This predicted continuous-tone image is based on a printer model or a display model that determines what would actually be seen upon printing or displaying the halftone binary image using the modeled output device.

Descriptions of exemplary processes for predicting an image based on a printer model can be found in U.S. Pat. Nos. 5,469,267 and 5,854,882, each incorporated herein by reference in its entirety, and can be used to predict a continuous-tone image from the halftone binary image. However, it should be appreciated that any method for determining an analog appearance of the halftone binary image will work equally well with the systems and methods of this invention. For example, the color printer model discussed in "Algorithm-Independent Color Calibration for Digital Halftoning" by S. Wang, also incorporated herein by reference in its entirety, can be used for color images, as described later.

Once the predicted continuous-tone image has been determined, by the output device modeling circuit 180, the predicted continuous-tone image is transferred to the image comparison circuit 150, which subtracts the original, or continuous-tone valued, image from the predicted continuous-tone image. The result of this subtraction is a feedback image. The feedback image contains the moiré effects, such as those shown in FIG. 1.

As discussed in more detail below, the low-pass filter circuit 170, in conjunction with the image mapping circuit 160, filters the feedback image.

The image comparison circuit 150, having received the filtered feedback image, in cooperation with the memory 130, and at the direction of the controller 120, then subtracts the filtered feedback image from the original continuous-tone image. This subtraction yields an adjusted image. This adjusted image has effectively reduced the moiré effects. The halftone conversion circuit 140 then converts the adjusted image into an adjusted halftone binary image. This adjusted halftone binary image can then be output, through the I/O interface 110 and the signal line 410, to the image sink 400.

Since moiré effects are visible as low frequency artifacts or information, the low-pass filter circuit 170 filters the feedback image. This low-pass filtering process reduces the high frequency components of the feedback image. Therefore, what remains after low-pass filtering is a more accurate approximation of the actual moiré effects.

Low-pass filtering of the feedback image in the filtering circuit 170 can be performed in a plurality of ways, and in either the image domain or the frequency domain. The low-pass filtering techniques are well described and documented in many textbooks. For example, in the previously referenced book, "Digital Image Processing" by Rafael C. Gonzalez and Richard E. Woods, several low-pass filtering methods in the image domain are described in Section 4.3.2, and other low-pass filtering methods in the frequency domain are described in Section 4.4.1.

Accordingly, any type of low-pass filtering technique can be used in the current invention, provided the filter reduces the information content of the image while preserving the moiré effects.

For example, in the image domain, the image mapping circuit 160 maintains an appropriate window based on the predetermined halftone screen that is used to convert the input image into a halftone image and a predetermined filter function.

The filter circuit 170, in conjunction with the mapping circuit 160, determines the value of pixels neighboring a target pixel of the window. The pixels in the window, or a portion of the window, are then filtered to determine a value of the target pixel of the window. For example, if the window is 3×3 pixels, filtering can be accomplished by averaging the pixels in the window to determine the target pixel value. However, as previously noted, it should be appreciated that any type of filtering can be used in conjunction with a window of any shape and/or size. For example, the pixels in the window can be assigned weights, averaged, subjected to a gaussian function, a pyramidal function, or the like. This process continues until all pixels in the feedback image have been processed.

Alternatively, the feedback image can be filtered in the frequency domain with comparable results. In particular, for filtering in the frequency domain, the feedback image is converted from the spatial domain to the frequency domain. As previously described, this can be accomplished by determining the fast-fourier transform for the feedback image. Once a feedback image is in the frequency domain, filtering can be performed based on a predetermined value or a predetermined function. This predetermined value or predetermined function will correspond to low-pass filtering the feedback image. This filtered frequency domain image is then-converted back into the image, or spatial, domain as the filtered feedback image.

FIGS. 3–20 illustrate the results of processing an original, continuous-tone image in accordance with the above-described system. In FIGS. 3–20, each column represents a stepwise result of the processes in the system. For example, FIGS. 3, 6, 9, 12, 15 and 18 represent the stepwise progression as the continuous-tone image in FIG. 3 is processed in accordance with the systems and methods of this invention.

Figure 3:
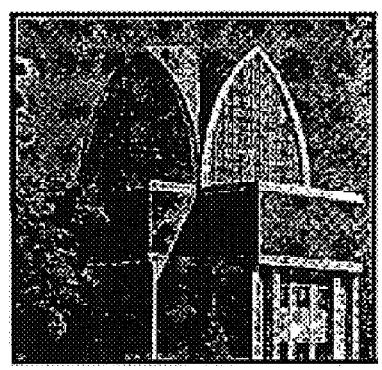
FIGS. 3–5 show a plurality of original halftone images having different halftone screen frequencies.
Figure 4:
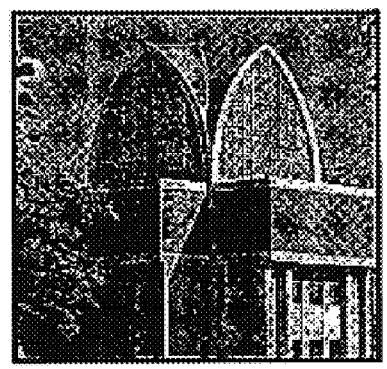
Figure 5:
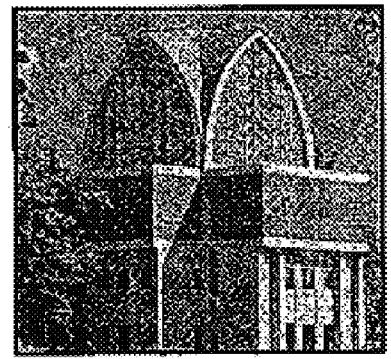

In particular, the previously halftoned images shown in FIGS. 3–5 contain the same original image, but with different original halftone screen frequencies. Specifically, the image shown in FIG. 3 has the highest original halftone screen frequency, the image shown in FIG. 4 has an intermediate original halftone screen frequency and the image shown in FIG. 5 has a relatively low original halftone screen frequency.

Figure 6:
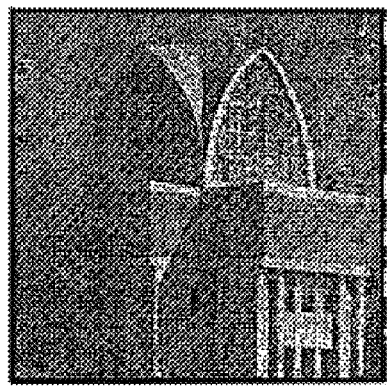
FIGS. 6–8 illustrate the same images as in FIGS. 3–5 after a second halftoning operation.
Figure 7:
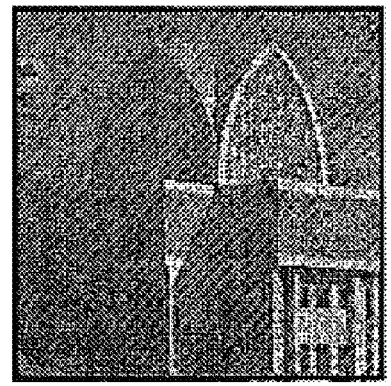
Figure 8:
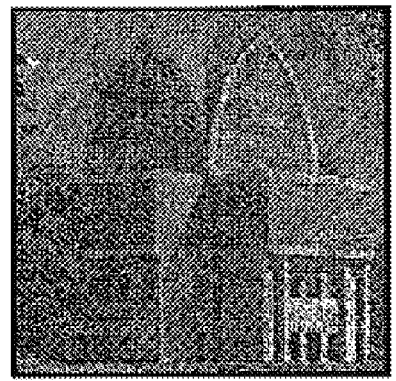

Conversion of the continuous tone images shown in FIGS. 3–5 into halftone binary images results in the images shown in FIGS. 6–8. The image shown in FIG. 6 clearly has a moiré pattern extending from the lower left portion to the upper right portion of the image. Similarly, the image shown in FIG. 7 has a finer moiré pattern again extending from the lower left portion to the upper right portion of the image. The image shown in FIG. 8, which corresponds to the relatively low halftone screen frequency original image shown in FIG. 5, has a relatively coarse moiré pattern again extending from the lower left portion to the upper right portion of the image. In the images shown in FIGS. 6–8, the actual moiré effects are the darkened lines that appear in the image.

Figure 9:
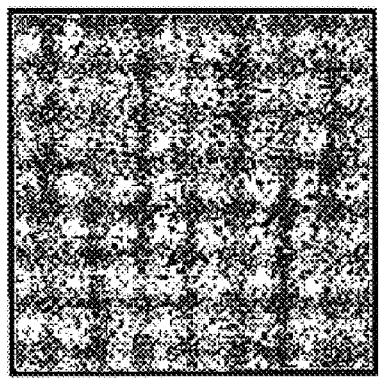
FIGS. 9–11 illustrate the difference between the original input halftone images and the halftone images shown in FIGS. 6–8.
Figure 10:
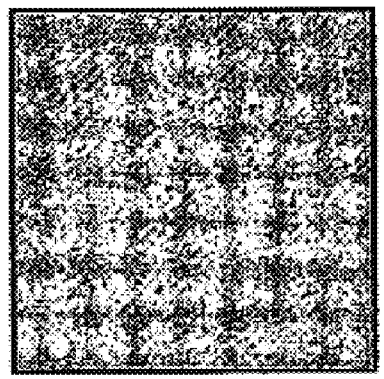
Figure 11:
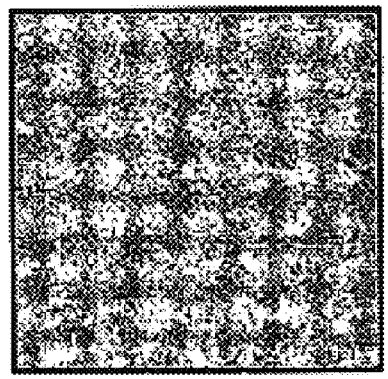

FIGS. 9–11 illustrate the result of subtracting the original images from the corresponding predicted continuous-tone images (not shown) of the halftone binary images in FIGS. 6–8. Therefore, FIGS. 9–11 illustrate the feedback images containing the moiré effects. In particular, each of the images shown in FIGS. 9–11 show different moiré patterns, or darkened lines, that extend from the lower left portion to the upper right portion of each of the corresponding halftoned images shown in FIGS. 6–8.

Figure 12:
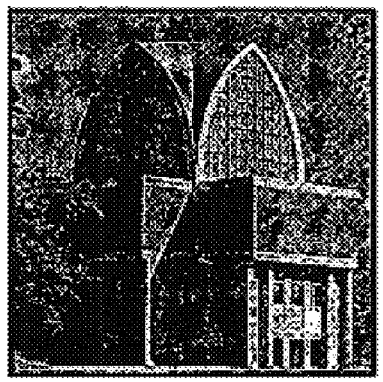
FIGS. 12–14 show the images illustrated in FIGS. 3–5 after negative feedback has been applied.
Figure 13:
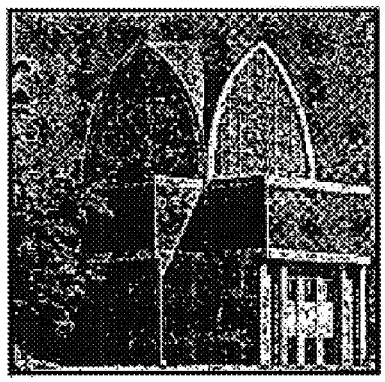
Figure 14:
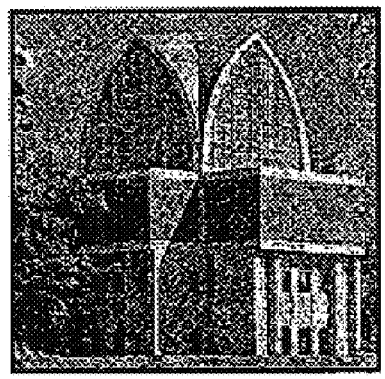

FIGS. 12–14 respectively show each of the adjusted continuous-tone images, after the feedback images shown in FIGS. 9–11 have been low-pass filtered and negatively fed back into the corresponding original input images in FIGS. 3–5, respectively.

Figure 15:
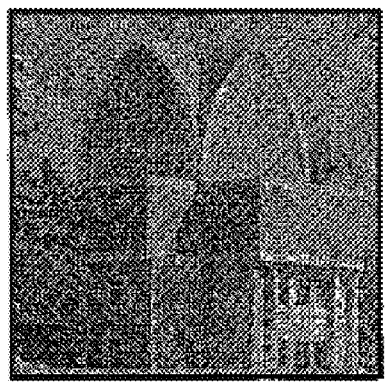
FIGS. 15–17 show the final halftone output images after negative feedback.
Figure 16:
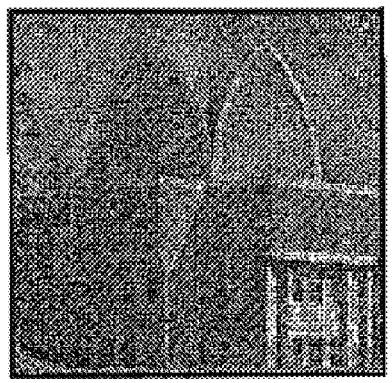
Figure 17:
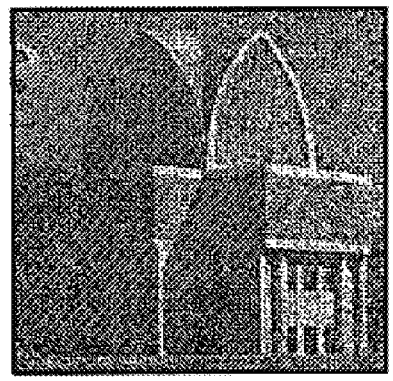

Once the filtered feedback images are fed back into the original continuous-tone images, the adjusted images are halftoned to generate the final halftone output images shown in FIGS. 15–17. Clearly, the moiré patterns in these images have been reduced, if not altogether eliminated.

Figure 18:
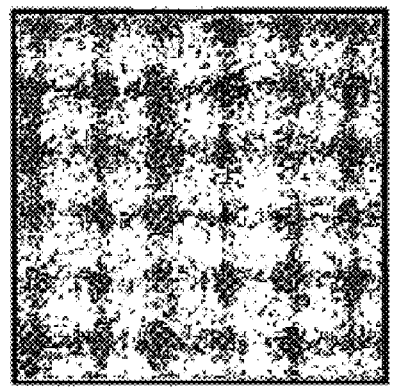
FIGS. 18–20 illustrate the difference between the original input halftone images, shown in FIGS. 3–5, and the final halftone output images, shown in FIGS. 15–17.
Figure 19:
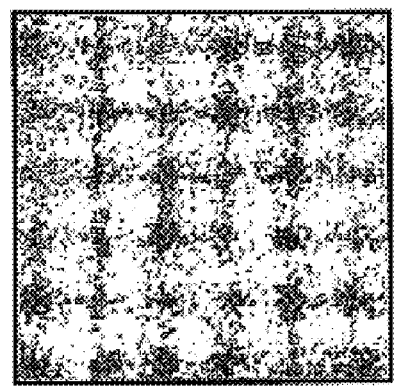
Figure 20:
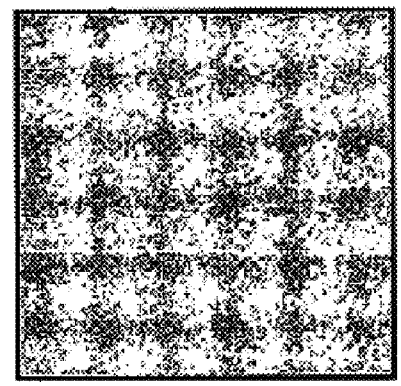

For illustration, FIGS. 18–20 illustrate the differences between the original input images shown in FIGS. 3–5 and the predicted continuous-tone images (not shown) of the halftone binary images shown in FIGS. 15–17. As a result, moiré effects, if any, remaining in the final output shown by FIGS. 15–17, would be visible in FIGS. 18–20. Clearly, in all three images, the moiré effects have been greatly reduced, if not altogether eliminated.

Figure 21:
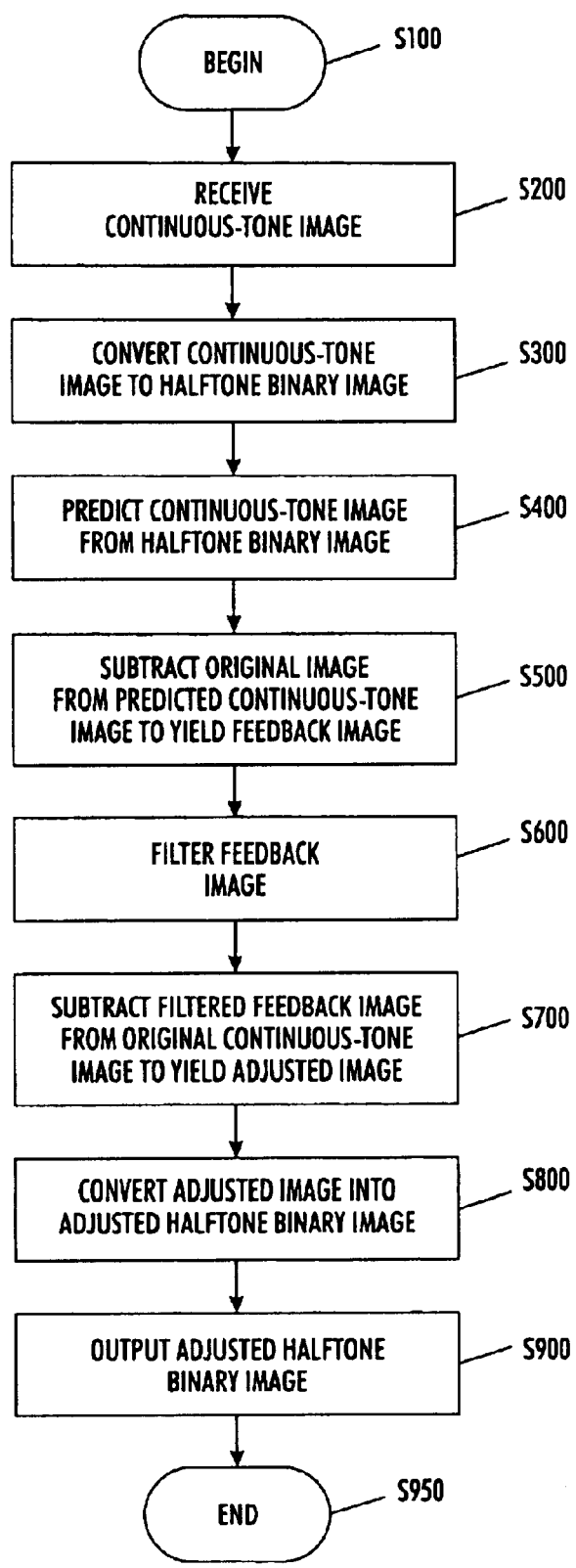
FIG. 21 is a flowchart outlining one exemplary embodiment of a method for reducing moiré effects according to this invention.

FIG. 21 is a flowchart outlining one exemplary embodiment of the method for reducing moiré effects in black-and-white images according to this invention. Control begins in step S100 and continues to step S200 where the continuous-tone image is received. Next, in step S300, the continuous-tone image is halftoned into a halftone binary image. Then, in step S400, a continuous-tone image is predicted based on the halftone binary image. Control then continues to step S500.

In step S500, the original image is subtracted from the predicted continuous-tone image to yield a feedback image. Next, in step S600, the feedback image is low-pass filtered. Then, in step S700, the filtered feedback image is subtracted from the original continuous-tone input image to yield an adjusted image. Control then continues to step S800.

In step S800, the adjusted image is halftoned into an adjusted halftone binary image. Next, in step S900, the adjusted halftone binary image is output as the final output image. Control then continues to step S950, where the control sequence ends.

Figure 22:
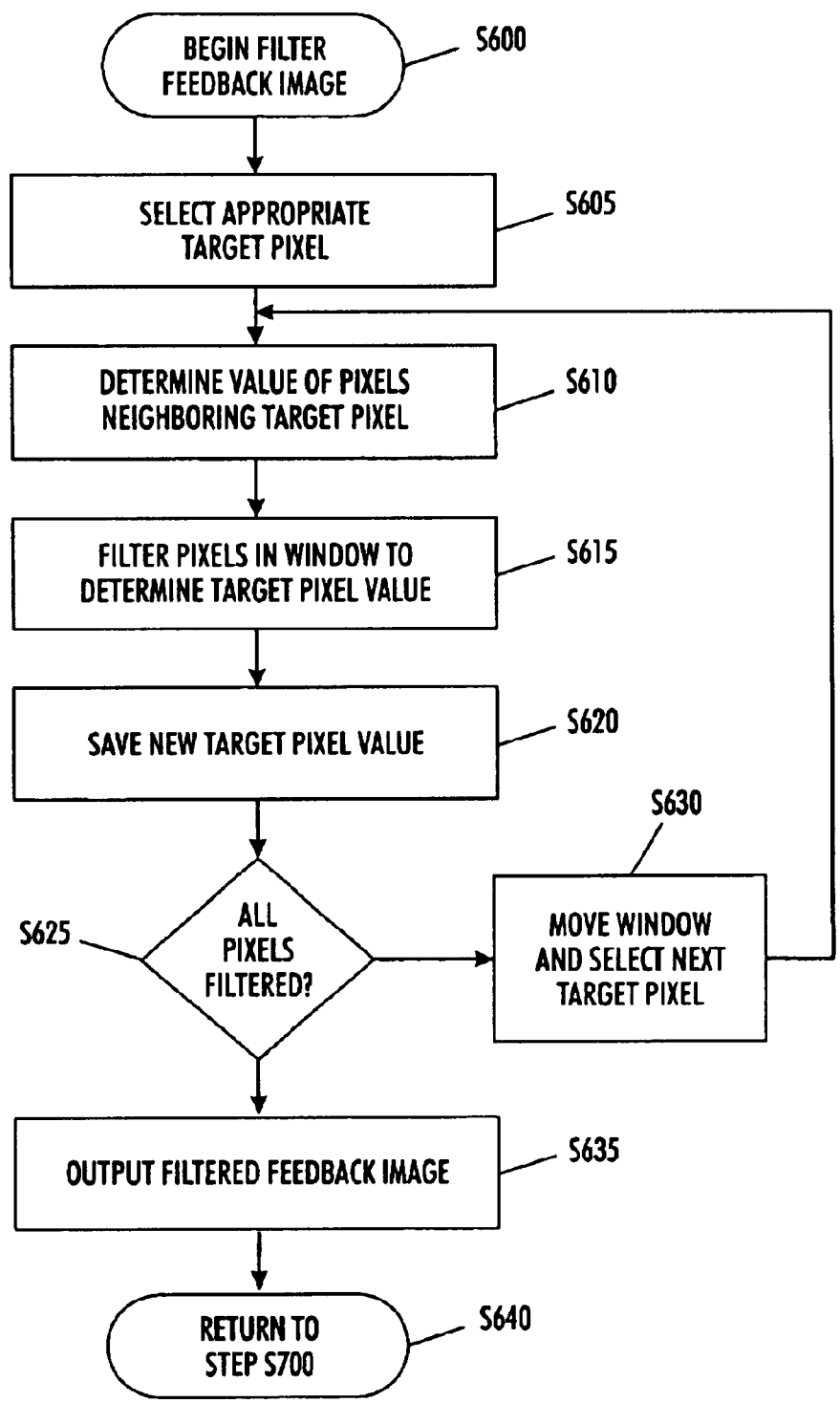
FIG. 22 is a flowchart outlining a first exemplary embodiment of a method for filtering the difference image of FIG. 21 according to this invention.

FIG. 22 is a flowchart outlining in greater detail a first exemplary method for filtering the feedback image of step S600. This filtering process removes information content of the image while preserving the moiré effect. However, any type of low-pass filtering technique can be used in the current invention, provided the filter reduces the information content of the image while preserving the moiré effects. Furthermore, as previously stated, an appropriate window is known which is based on the predetermined halftone screen that is used to convert the input image into a halftone image and a predetermined filter function. Additionally, as previously noted, it should be appreciated that any type of filtering can be used in conjunction with a window of any shape and/or size.

Beginning in step S600, control continues to step S605, where an appropriate target pixel is selected. Next, in step S610, the values of the pixels neighboring the target pixel are determined. Then, in step S615, the pixels in the window are filtered to determine the center pixel value. Control then continues to step S620.

In step S620, the new center pixel value is saved. Next, in step S625, a determination is made whether all the pixels within the feedback image have been filtered. If all the pixels in the feedback image have not been filtered, control continues to step S630. Otherwise, control jumps to step S635.

In step S630, the next pixel in the feedback image is selected for filtering and the window is moved. Control then returns to step S610. In contrast, in step S635, the filtered feedback image is output. Control then continues to step S640, where control returns to step S700.

Figure 23:
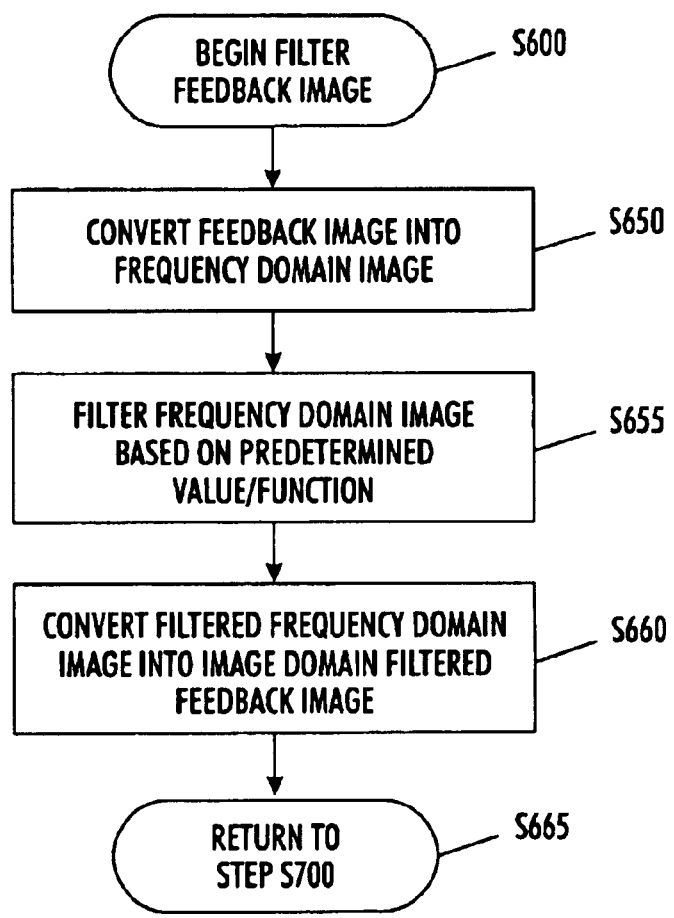
FIG. 23 is a flowchart outlining a second exemplary embodiment of the method for filtering the difference image of FIG. 21 according to this invention.

Alternatively, as previously discussed, the feedback image can be filtered in the frequency domain. FIG. 23 is a flowchart outlining in greater detail a second exemplary method for filtering the feedback image of step S600. Beginning in step S600, control continues to step S650 where the feedback image is converted into the frequency domain. For example, as previously discussed, a fast-fourier transform of the feedback image can be used to translate the feedback image from the image, or spatial, domain to the frequency domain. Next, in step S655, the frequency domain image is filtered based on a predetermined value or a predetermined function. Then, in step S660, the low-pass filtered frequency domain image is converted back into an image domain filtered feedback image. Control then continues to step S665, where control returns to step S700.

The previously described systems and methods assume that the received image is a device-dependent continuous-tone image. However, if the received continuous-tone image is in a device-independent format, such as in the CIE-Lab color space, the received device-independent continuous-tone image needs to be converted into a device-dependent color space before the processing to remove or reduce moiré effects according to this invention. Similarly, if the input image is binary valued image data, the binary valued data can be converted into equivalent continuous-tone image data values before halftoning.

While the above-described systems and methods for reducing moiré effects in continuous-tone images are particularly well suited for black-and-white, or gray-scale images, or within one-particular color channel of a color image, they do not fully compensate for any moiré effects that may be created between two or more color channels of a single color image. In particular, when a continuous-tone color image is converted into a halftone binary image, moiré patterns can be created between color channels, as well as in each of the individual color channels. The above described systems and methods reduce moiré effects arising within any single channel, but do not reduce moiré effects arising between two or more channels.

Figure 24:
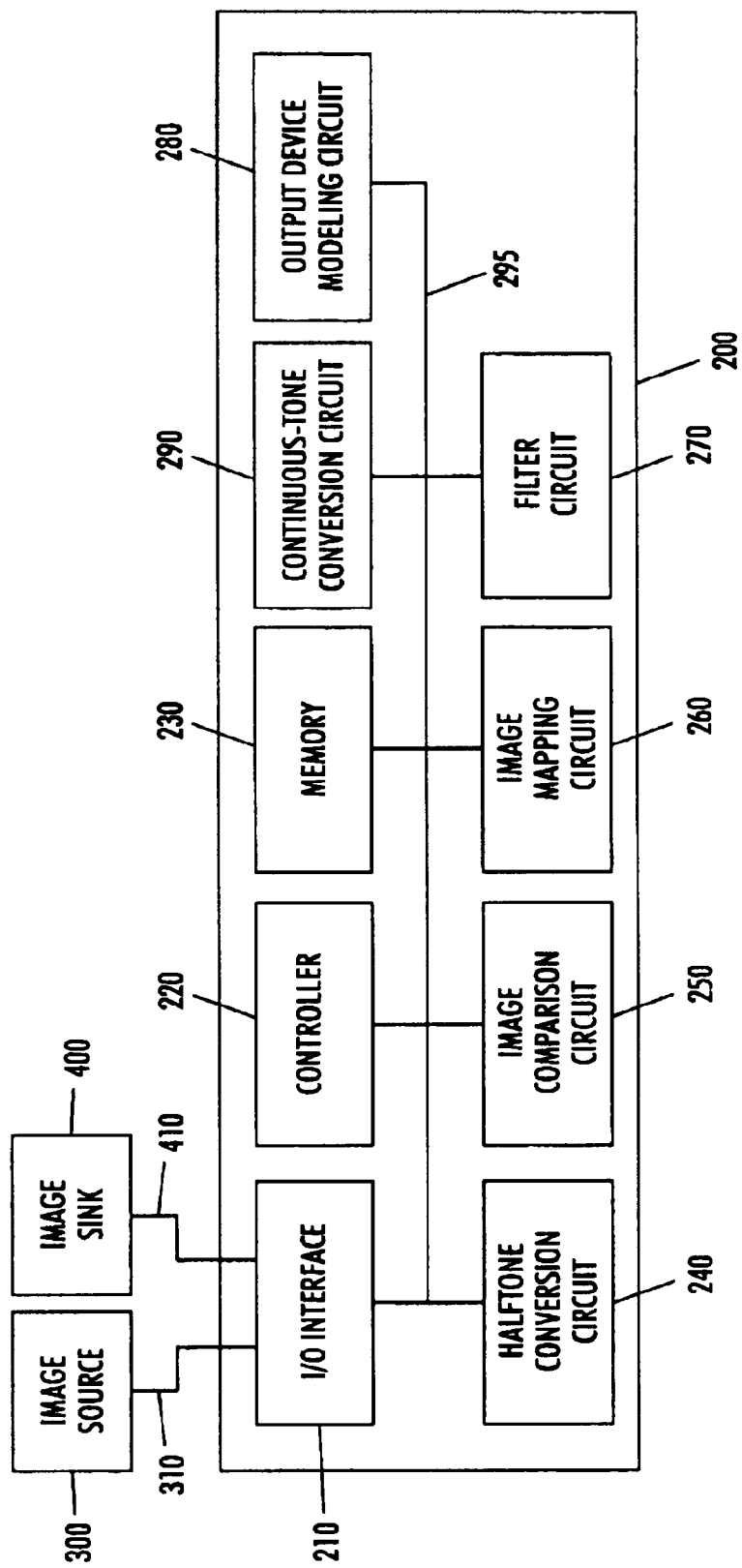
FIG. 24 is a functional block diagram of a second exemplary embodiment of moiré effect reduction systems according to this invention.

FIG. 24 illustrates a second exemplary embodiment of a moiré effects reduction system 200. The moiré effects reduction system 200 is particularly useful for color images according to this invention. The moiré effect reduction system 200 comprises an I/O interface 210, a controller 220, a memory 230, a halftone conversion circuit 240, an image comparison circuit 250, an image mapping circuit 260, a low-pass filtering circuit 270, an output device modeling circuit 280, a continuous-tone color conversion circuit 290 and a data/control bus 295.

Similar to the first exemplary embodiment of the moiré effect reduction system 100, a color input image is received from the image source 300 via the signal line 310 by the I/O interface 210. The received halftone or continuous-tone color input image is then converted, with the cooperation of the controller 220 and the memory 230, and halftoned by the halftone conversion circuit 240 into a color halftone binary image.

The output device modeling circuit 280 then predicts a continuous-tone color image based on the halftone binary image generated by the halftone conversion circuit 240. The original continuous-tone color image is then subtracted from the predicted continuous-tone color image by the image comparison circuit 250 to yield a color feedback image.

Again, similar to the first embodiment of the moiré effect reduction system 100, the color feedback image is then filtered by the low-pass filtering circuit 270, with the cooperation of the image mapping circuit 260. The result of this filtering yields a filtered color feedback image. The filtered feedback image is then subtracted from the original continuous-tone color image by the image comparison circuit 250 to yield an adjusted color image.

The adjusted color image is then halftoned by the halftone conversion circuit 240 to yield a binary color image, the output image. This output image can then be forward through the I/O interface 210 over the signal line 410 to the image sink 400.

As discussed in relation to the first exemplary embodiment of the moiré effects reduction system 100, the feedback image can be filtered in either the spatial or the frequency domain. There is no particular advantage to choosing one type or technique of filtering over another. The only drawback is the extra processing requirements of performing the filtering in the frequency domain.

Figure 25:
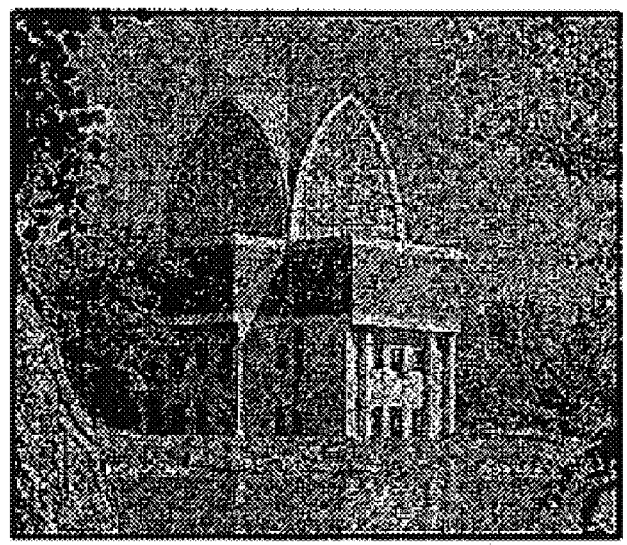
FIG. 25 shows the result of halftoning a previously halftoned color image without negative feedback.

FIGS. 25–28 illustrate the stepwise results of reducing moiré effects in a color image in accordance with the second exemplary embodiment of the moiré effects reduction system 200 according to this invention. In particular, FIG. 25 shows the output after re-halftoning a previously halftoned color image. As a result of the halftoning process, the image in FIG. 25 shows moiré effects extending from the lower left portion to the upper right portion of the image as well as from the lower right portion to the upper left portion of the image. This produces a crisscrossed or hatched pattern throughout the image. In particular, in the original image, the pattern is visible as a series of parallel lines oriented in the 45° and the −45° directions.

Figure 26:
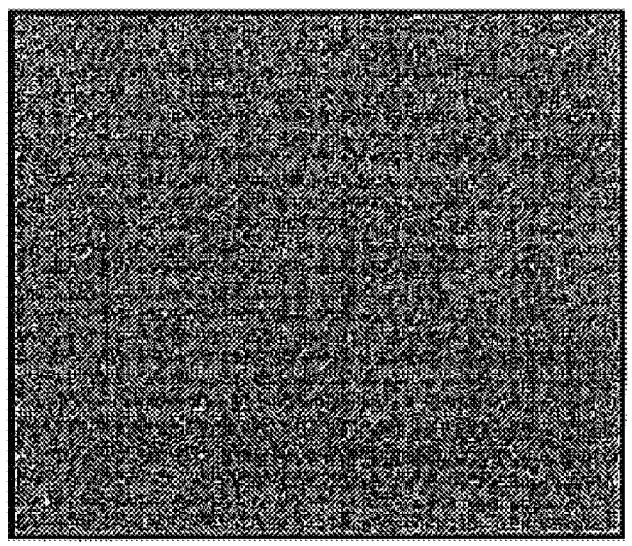
FIG. 26 shows the difference between the original color image and the halftone image in FIG. 25.

FIG. 26 illustrates the difference between the original continuous-tone color image (not shown) and the predicted continuous-tone color image (not shown) based on the halftone image shown in FIG. 25. This resultant feedback image contains the moiré effects that are to be removed from the halftone binary image. In FIG. 26, the moiré patterns are clearly visible as parallel lines in the 45° and the −45° directions.

Figure 27:
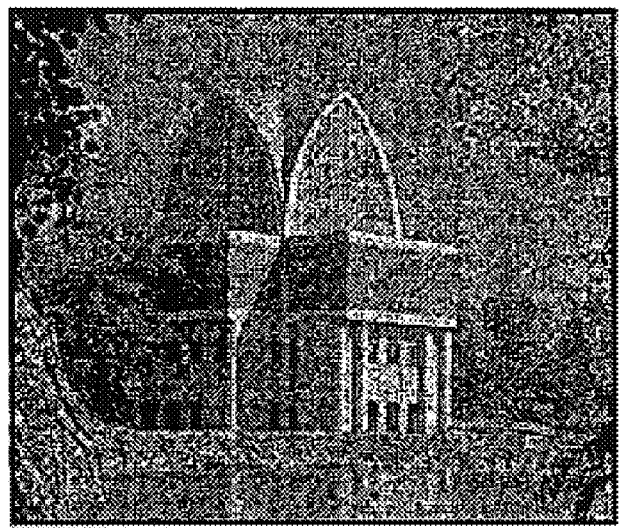
FIG. 27 shows the final color halftone output after negative feedback.

FIG. 27 shows the final halftone output after the filtered feedback image is subtracted from the original continuous-tone image, and this adjusted image converted into an adjusted continuous-tone image that has been halftoned. Again, the moiré effects within channels, as well as of the moiré effects between channels, have been reduced or virtually eliminated.

Figure 28:
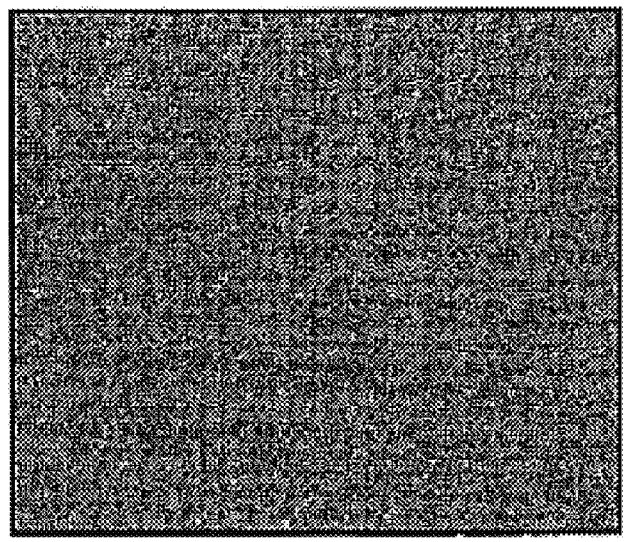
FIG. 28 shows the difference between the original color image and the final halftone output image in FIG. 27.

By way of verification, FIG. 28 illustrates the difference between the original continuous-tone color image and the predicted continuous-tone color image (not shown) based on the final halftone output image shown in FIG. 27. This difference image would reveal the moiré patterns, if any, that still exist in the final halftone output. Clearly, the moiré patterns have been greatly reduced.

Figure 29:
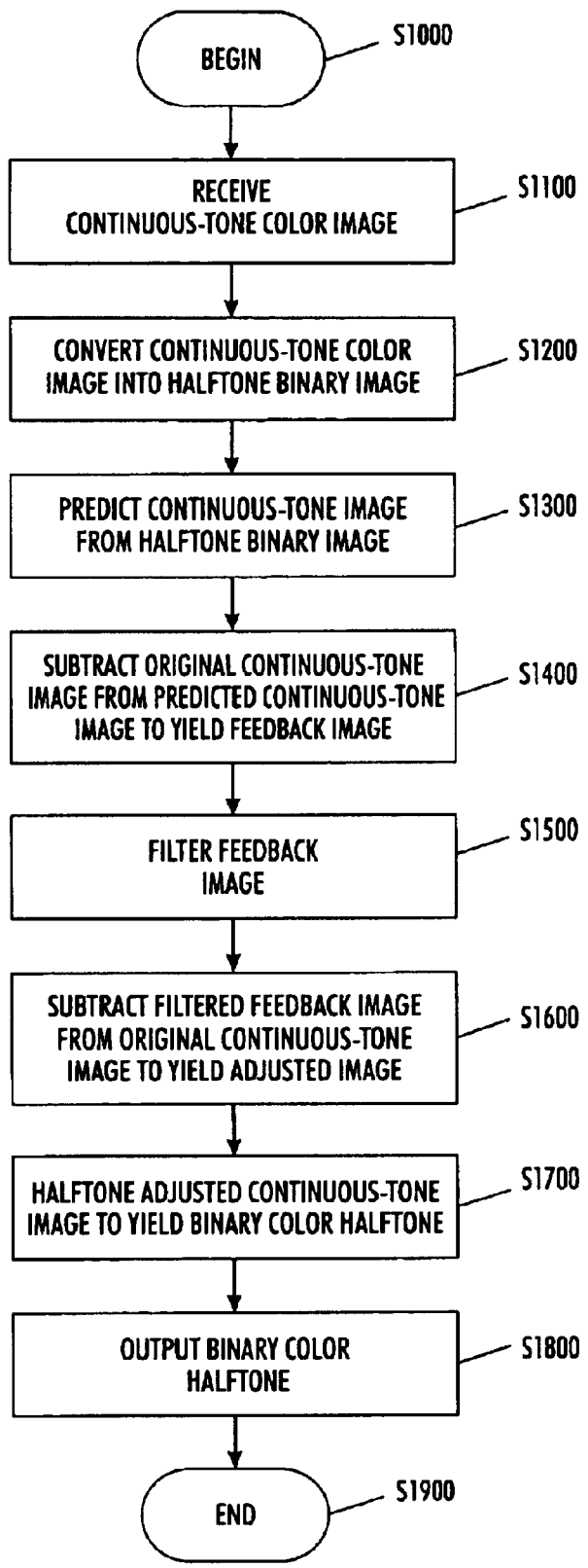
FIG. 29 is a flowchart outlining a first exemplary method for reducing moiré effects in color halftones according to this invention.

FIG. 29 is a flowchart outlining a second exemplary embodiment of the method for reducing moiré effects in a color continuous-tone image according to this invention. As shown in FIG. 29, control begins in step S1000, and continues to step S100 where an input original image is received. Next, in step S1200, the continuous-tone valued image is halftoned into a halftone binary image. Then, in step S1300, a continuous-tone image is predicted based on the halftone binary image. Control then continues to step S1400.

In step S1400, the original continuous-tone color image is subtracted from the predicted continuous-tone image. This yields a feedback color image. Next, in step S1500, the feedback image is low-pass filtered. As previously discussed, this low-pass filtering can occur in either the image, or spatial, domain or the frequency domain. Examples of the methods for performing the low-pass filtering can be found in relation to the methods discussed in conjunction with FIGS. 22 and 23. Then, in step S1600, the filtered feedback image is subtracted from the original continuous-tone color image. This yields an adjusted color image. Control then continues to step 1700.

In step S1700, the adjusted color image is halftoned to output an adjusted binary color halftone image. Next, in step S1800, the binary color halftone image is output. Control then continues to step S1900, where the control sequence ends.

The previously described method assumes that the received original image is a device-dependent continuous-tone color image. However, if the received continuous-tone color image is in a device-independent format, such as in the CIE-Lab color space, the received device-independent continuous-tone color image needs to be converted into a device-dependent color space, such as the CMYK color space, before processing. Similarly, if the input image is binary valued image data, the binary valued data can be converted into equivalent continuous-tone image data values before halftoning.

Figure 30:
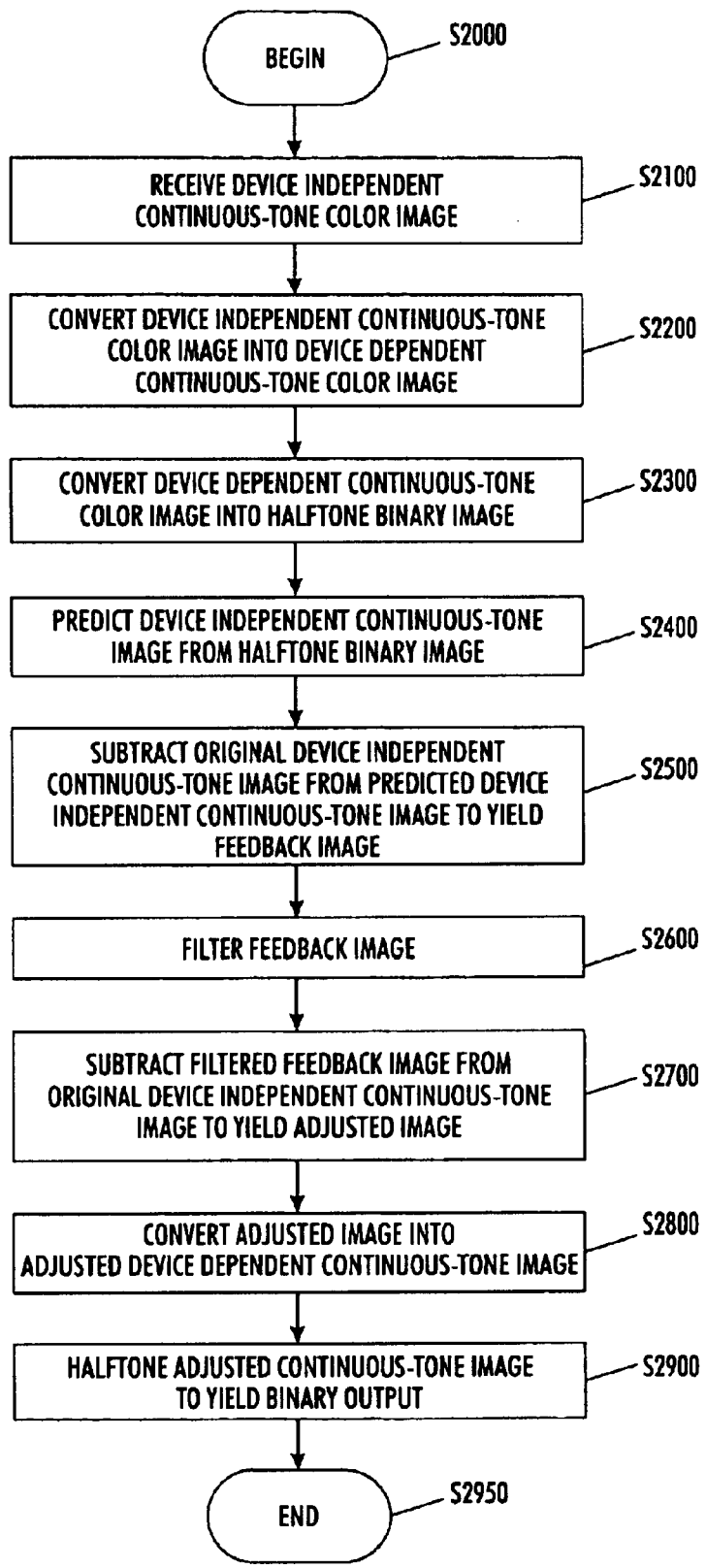
FIG. 30 is a flowchart outlining a second exemplary method for reducing moiré effects in color halftone images according to this invention.

FIG. 30 is a flowchart outlining a third exemplary-embodiment of the method for reducing moiré effects in a device-independent continuous-tone color image according to this invention. Control begins in step S2000. Next, in step S2100, a device-independent continuous-tone color image, such as an image in the CIE-Lab color space, is received. Next, in step S2200, the device-independent continuous-tone color image is converted into a device-dependent continuous-tone color image, such as in image in the CMYK color space. Then, in step S2300, the device-dependent continuous-tone color image is converted into a color halftone binary image, such as a binary valued CMYK image. Control then continues to step S2400.

In step S2400, a device-independent continuous-tone image in the original color space is predicted based on the color halftone binary image. Next, in step S2500, the original device-independent continuous-tone image is subtracted from the predicted device-independent continuous-tone image. This yields a color feedback image in the device-independent color space. Then, in step S2600, the color feedback image is low-pass filtered. As previously discussed, this low-pass filtering can at least be accomplished by either of the methods previously described and outlined in the flowcharts shown in FIGS. 22 and 23. Control then continues to step S2700.

In step S2700, the filtered feedback image is subtracted from the original device-independent continuous-tone image to yield an adjusted device-independent color image. Next, in step S2800, the adjusted device-independent color image is converted into an adjusted device-dependent continuous-tone color image. Then, in step S2900, the adjusted device-dependent continuous-tone color image is halftoned to yield the final binary color output image. Control then continues to step S2950, where the control sequence ends.

As shown in FIGS. 2 and 24, the moiré effect reduction systems 100 and 200, are each preferably implemented on a programmed general-purpose computer. However, the moiré effect reduction systems 100 and 200 can each also be implemented on a special purpose computer, a programmed microprocessor or microcontroller and peripheral integrated circuit elements, an ASIC or other integrated circuit, a digital signal processor, a hardwired electronic logic circuit such as discrete element circuit, a programmable logic device such as a PDL, PLA, FPGA or PAL, or the like. In general, any device, capable of implementing a finite state machine that is in turn capable of implementing the flowcharts shown in one or more of FIGS. 21–23 29 and 30, can be used to implement the moiré effect reduction system in accordance with this invention.

Furthermore, the disclosed methods may be readily implemented in software using object oriented software development environments that provide portable source code that can be used on a variety of computer or workstation hardware platforms. Alternatively, the disclosed moiré effect reduction system may be implemented partially or fully in hardware using standard logic circuits or a VLSI design. Whether software or hardware is used to implement the system is dependent on the speed and efficiency requirements of the system, the particular function, and the particular software or hardware systems or microprocessor or microcomputer systems being utilized. The moiré effect reduction systems and methods described above, however, can be readily implemented in hardware or software using any known or later developed systems, structures devices and/or software by those skilled in the applicable arts without undue experimentation from the functional description provided herein together with a general knowledge of the computer arts.

Moreover, the disclosed methods may be readily implemented as software executed on a programmed general purpose computer, a special purpose computer, a microprocessor or the like. In this case, the methods and systems of this invention can be implemented as a routine embedded in a printer driver, as a resource residing on a server or print server, or the like. The moiré effect reduction systems 100 and 200 can also be implemented by physically incorporating them into a software and/or hardware system, such as the hardware and software systems of a printer or a digital photocopier.

It is, therefore, apparent that there has been provided, in accordance with the present invention, systems and methods for reducing moiré effects in gray-scale and color halftone images. While this invention has been described in conjunction with preferred embodiments thereof, it is evident that many alternatives, modifications, and variations will be apparent to those skilled in the art. Accordingly, Applicants intend to embrace all such alternatives, modifications and variations that fall within the spirit and scope of this invention.

What is claimed is:

1. A moiré effect reduction system, comprising:
    a halftone conversion circuit that converts an original image into a halftone image;
    an output device modeling circuit that predicts a continuous-tone image from the halftone image;
    an image comparison circuit that determines a feedback image based on the original image and the predicted continuous-tone image;
    a filtering circuit that filters the feedback image to yield a filtered feedback image; and
    an image mapping circuit that maintains an appropriate window based on a predetermined halftone screen, wherein the image comparison circuit compares the filtered feedback image and the original image to yield an adjusted image; and
    the filter circuit and the image mapping circuit select a value of pixels neighboring a target pixel of the window to determine a center pixel value.

2. The system of claim 1, wherein the halftone conversion circuit converts the adjusted image into a halftone output image.

3. The system of claim 1, wherein the output device modeling circuit is based on at least one of a printer output model and a display device output model.

4. The system of claim 1, wherein the filtering circuit filters the feedback image in at least one of an image domain and a frequency domain.

5. The system of claim 1, wherein the filtering circuit reduces an information content in the feedback image, while retaining at least a portion of the moiré effect.

6. The system of claim 1, wherein the filtering circuit is a low-pass filter.

7. The system of claim 1, wherein the original image is at least one of a continuous-tone image and a halftone image.

8. A method for reducing moiré effects in a previously halftoned image, comprising:
    converting an original image into a halftone image;
    predicting a predicted image based on the halftone image;
    comparing the original image to the predicted image to yield a feedback image by an image comparison circuit;
    filtering the feedback image;
    maintaining an appropriate window based on a predetermined halftone screen;
    selecting a value of pixels neighboring a target pixel of the window to determine a center pixel value by a filter circuit and an image mapping circuit,
    comparing the filtered feedback image to the original image to yield an adjusted image by the image comparison circuit; and
    converting the adjusted image into a halftone output image.

9. The method of claim 8, wherein predicting the predicted image comprises predicting the predicted image based on at least one of a printer output model and a display device output model.

10. The method of claim 8, wherein filtering the feedback image comprises filtering the feedback image in at least one of a spatial domain and a frequency domain.

11. The method of claim 8, wherein filtering the feedback image reduces an information content in the feedback image while retaining at least a portion of the moiré effect.

12. The method of claim 8, wherein filtering the feedback image comprises low-pass filtering the feedback image.

13. The method of claim 8, wherein the original image is at least one of a continuous-tone image and a halftone image.

14. A moiré effect reduction system for an original device-independent image, comprising:
    an image mapping circuit that converts the original device-independent image into a device-dependent image;
    a halftone conversion circuit that converts the device-dependent image into a halftone image;
    an output device modeling circuit that predicts a device-independent image from the halftone image;
    an image comparison circuit that compares the original device-independent image to the predicted device-independent image to yield a feedback image;
    a filtering circuit that filters the feedback image to yield a filtered feedback image; and
    an image mapping circuit that maintains an appropriate window based on a predetermined halftone screen,
    wherein the image comparison circuit compares the filtered feedback image and the original device-independent image to yield an adjusted image, and
    the filter circuit and the image mapping circuit select a value of pixels neighboring a target pixel of the window to determine a center pixel value.

15. The system of claim 14, wherein the halftone conversion circuit converts the adjusted image into a halftone output image.

16. The system of claim 14, wherein the original device-independent image is at least one of a device-independent continuous-tone color image and a device-independent continuous-tone black-and-white image.

17. The system of claim 14, wherein the output device modeling circuit is based on at least one of a printer output model and a display device output model.

18. The system of claim 14, wherein the filtering circuit filters the feedback image in at least one of an image domain and a frequency domain.

19. The system of claim 14, wherein the filtering circuit reduces an information content in the feedback image, while retaining at least a portion of the moiré effect.

20. The system of claim 14, wherein the filtering circuit is a low-pass filter.

21. A method for reducing moiré effects in a previously halftoned image, comprising:

converting an original device-independent image into a device-dependent image;

converting the device-dependent image into a halftone image;

predicting a predicted device-independent image based on the halftone image;

comparing the original device-independent image to the predicted device-independent image to yield a feedback image by an image comparison circuit;

filtering the feedback image;

maintaining an appropriate window based on a predetermined halftone screen;

selecting a value of pixels neighboring a target pixel of the window to determine a center pixel value by a filter circuit and an image mapping circuit, comparing the filtered feedback image to the original device-independent image to yield an adjusted image by the image comparison circuit; and converting the adjusted image into a halftone output image.

22. The method of claim 21, wherein predicting the predicted image comprises predicting the predicted image based on at least one of a printer output model and a display device output model.

23. The method of claim 21, wherein filtering the feedback image comprises filtering the feedback image in at least one of a spatial domain or a frequency domain.

24. The method of claim 21, wherein filtering the feedback image reduces an information content in the feedback image, while retaining at least a portion of the moiré effect.

25. The method of claim 21, wherein filtering the feedback image comprises low-pass filtering the feedback image.

26. The method of claim 21, wherein the original device-independent color image is at least one of a device-independent continuous-tone color image and a device-independent black-and-white image.

27. The method of claim 21, further comprising converting the adjusted image into an adjusted device-dependent continuous-tone image.

* * * * *